United States Patent

Vollmann

[11] Patent Number: 5,986,854
[45] Date of Patent: Nov. 16, 1999

[54] MAGNETIC CASSETTE RECORDER WITH REVERSING AND TRANSLATING MAGNETIC HEAD

[75] Inventor: Norbert C. Vollmann, Eindhoven, Netherlands

[73] Assignee: U.S. Philips Corporation, New York, N.Y.

[21] Appl. No.: 08/224,213

[22] Filed: Apr. 7, 1994

[30] Foreign Application Priority Data

Jun. 28, 1993 [EP] European Pat. Off. .............. 93201877

[51] Int. Cl.⁶ ...................................................... G11B 5/54
[52] U.S. Cl. ........................... 360/105; 360/106; 360/108
[58] Field of Search .................................. 360/96.1–96.5, 360/104–109

[56] References Cited

U.S. PATENT DOCUMENTS

| | | | |
|---|---|---|---|
| 3,949,421 | 4/1976 | Herleth et al. ............................ | 360/109 |
| 4,636,895 | 1/1987 | Tomita ..................................... | 360/105 |
| 4,945,437 | 7/1990 | Oguchi et al. ........................... | 360/105 |
| 5,065,266 | 11/1991 | Yoshimura ............................... | 360/96.3 |
| 5,067,034 | 11/1991 | Kido ........................................ | 360/96.3 |

FOREIGN PATENT DOCUMENTS

| | | |
|---|---|---|
| 2278509 | 2/1991 | Japan . |
| 3097114 | 7/1991 | Japan . |

*Primary Examiner*—Jefferson Evans
*Attorney, Agent, or Firm*—Steven S. Rubin

[57] ABSTRACT

A magnetic cassette recorder comprises a magnetic head 19 which can be translated in directions 21 and 23 between an operating position, in which the head cooperates with a magnetic tape in an inserted cassette 3, and a withdrawn position, in which the head is clear of an inserted cassette. In the withdrawn position the head can be pivoted about a pivotal axis 25 between a first angular position and a second angular position. The head is electrically connected to stationary parts of the recorder by means of a flat flexible multiple electrical conductor 27, such as a foil carrying printed electrical conductor tracks or a flat cable. The conductor is arranged as a cylindrical spiral about the pivotal axis 25 and its end 55 which is remote from the head is connected directly to stationary parts of the recorder, so that translations of the head in the axial direction result in the spiral being extended/compressed and pivotal movements of the head result in the spiral being coiled/uncoiled.

5 Claims, 4 Drawing Sheets

MAGNETIC CASSETTE RECORDER WITH REVERSING AND TRANSLATING MAGNETIC HEAD

BACKGROUND OF THE INVENTION

The invention relates to a magnetic cassette recorder comprising a magnetic head which can be translated between an operating position, in which the head cooperates with a magnetic tape in an inserted cassette, and a withdrawn position, in which the head is clear of an inserted cassette, and which is, moreover, pivotable about a pivotal axis between a first angular position and a second angular position, which head is electrically connected to stationary parts of the recorder by means a flat flexible multiple electrical conductor, such as a foil carrying printed electrical conductor tracks or a flat cable.

Recorders of this type are used mainly for audio applications employing cassettes for recording and reproduction in both a forward and a reverse direction, such as the well-known Analog Compact Cassette recorders and the more recent Digital Compact Cassette recorders. In recorders of this type the tape is scanned in two adjacent parallel zones, one zone being scanned in one direction and the other zone being scanned in the other direction. The magnetic head may be constructed in such a manner that in fixed position it is capable of cooperating correctly with each of the zones in each of the two tape transport directions. However, in many cases a head of simpler construction is used, which must be reversed to cooperate with the relevant zone of the tape in the reverse transport direction. With this construction the head requires a smaller number of active transducing gaps than a head for a recorder using the first-mentioned construction. However, a consequence is that a mechanism must be provided for the reversal of the head, which partly outweighs the price advantage gained by the use of a simpler head. Some heads have many transducing gaps, such as the heads for DCC recorders, which have at least nine digital write gaps and nine digital read gaps and a number of additional gaps, such as two analog read gaps, i.e. at least twenty transducing gaps in total. Consequently, a large number of electrical conductors are needed to transfer signals between the head and the stationary electronic circuitry of the recorder. Providing a reliable electrical connection between pivoting and translating heads having such a large number of transducing gaps and the stationary parts of the recorder at a moderate cost price is a major technical challenge.

In the currently non-prepublished EP Application 92203768.4 (PHO 91-512, herewith incorporated by reference) it has been proposed to mount the head on a hollow pivotal shaft and to construct the electrical conductor as a two-part printed foil connected to the magnetic head through the hollow shaft. Mounting the foil is difficult, the space available for the foil inside the hollow shaft is small, and the length of the foil is comparatively great, resulting in a large distance between the head and the stationary parts to which the foil is connected.

It is an object of the invention to provide a recorder of the type defined in the opening paragraph, in which the magnetic head is connected to the stationary parts of the recorder in an effective and economical manner and so as to contribute to minimal dimensions of the recorder.

To this end the recorder in accordance with the invention is characterized in that the conductor is arranged as a cylindrical spiral about the pivotal axis and its end which is remote from the head is connected directly to the stationary parts of the recorder, so that translations of the head in the axial direction result in the spiral being extended/compressed and pivotal movements of the head result in the spiral being coiled/uncoiled.

The advantage of the invention is that only a short conductor is required and that this conductor can be mounted rapidly and simply. Mounting flat conductors is comparatively expensive and problematic. The favourable effect is obtained by the use of a spiral which is deformable in two directions, i.e. both in the translating and in the pivoting direction. This means that no separate provisions are needed for each of the two directions.

An advantageous embodiment of the invention is characterized in that the conductor end which is remote from the head is a conductor portion which extends parallel to the direction of the pivotal axis. The conductor is short, yet it can easily be connected to the stationary parts of the recorder, for example by means of a connector. Moreover, this embodiment is very suitable for use with a connector in the form of flat cable. Such cables are readily available only as straight cables having their ends cut at right angles to the sides of the cable.

A further embodiment of the invention is characterized in that the conductor end which is remote from the head is a conductor portion which extends transversely of the direction of the pivotal axis. This embodiment is particularly suitable for use with printed foils. Conductors of this type are available in almost any form and consequently provide much freedom as regards the location of the parts to be interconnected inside an apparatus.

A further embodiment of the invention is characterized in that the conductor end which is remote from the head is disposed in a plane which extends at least substantially tangentially to the outer turn of the spiral. By means of this embodiment it is avoided that the conductor part adjacent the spiral is bent unnecessarily and, hence, that the conductor is subjected to an unnecessarily high mechanical load.

A further embodiment of the invention is characterized in that the conductor end which is remote from the head extends at an acute angle to the direction of the pivotal axis. This embodiment is conceivably more favourable in order to reduce stresses in the conductor. These stresses may be caused in particular by the translation of the head.

BRIEF DESCRIPTION OF THE DRAWINGS

The invention will now be described in more detail, merely by way of illustration, with reference to the drawings, which relate to a possible embodiment to which the invention is not limited and in which.

DESCRIPTION OF THE PREFERRED EMBODIMENT

Figure 1:
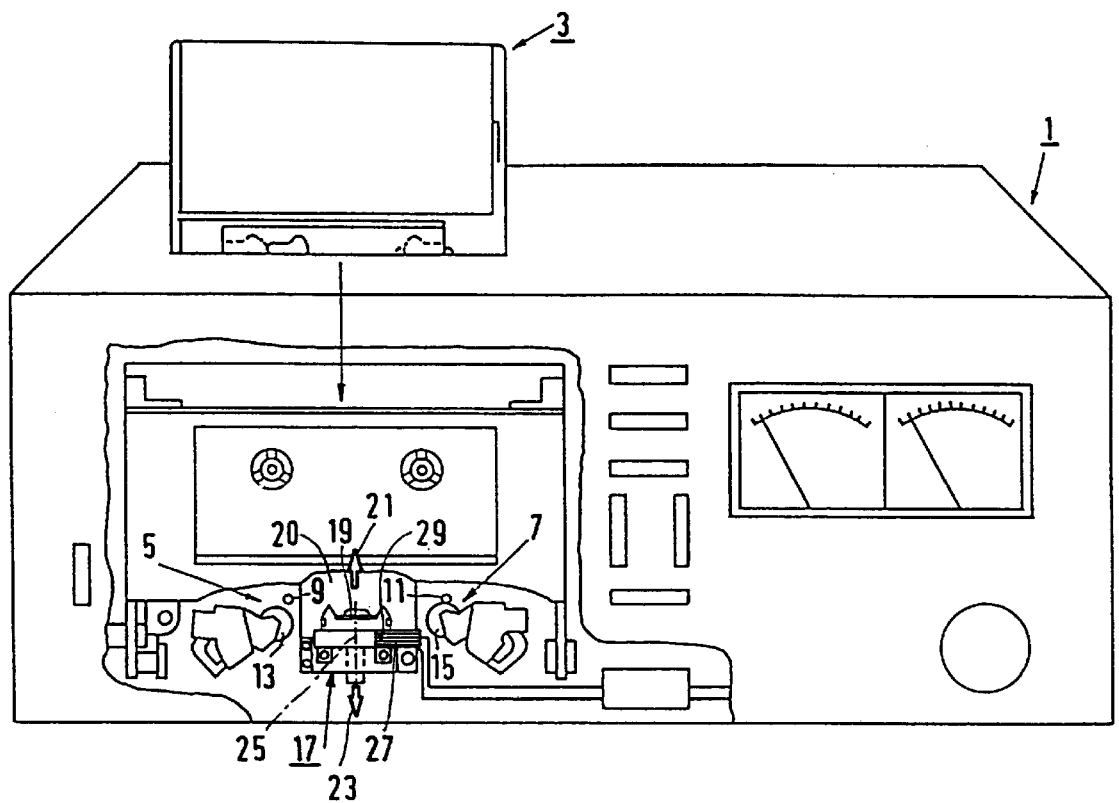
FIG. 1 is a perspective front view of a magnetic cassette recorder of the DCC type.

FIG. 1 is a perspective front view of a magnetic cassette recorder 1 for playing cassettes 3. Such recorders are generally known, for which reason they will not be described comprehensively. The recorder comprises two pressure roller units 5 and 7 having pressure rollers 13 and 15 which in conjunction with two capstans 9 and 11 provide the transport of the magnetic tape (not shown) present in the cassette 3. A magnetic head 19 is arranged on a magnetic-head unit 20 which can be translated as indicated by the arrows 21 and 23 between an operating position, in which the head 19 cooperates with the magnetic tape in an inserted cassette, and a withdrawn position, in which the head is clear of an inserted cassette. Moreover, the head 19 is pivotable about a pivotal axis 25 between a first angular position and a second angular position which is 180° spaced from the first angular position. The head is electrically connected to stationary parts of the recorder by means of an electrical conductor 27 comprising printed electrical conductor tracks. The conductor 27 is arranged as a cylindrical spiral about the pivotal axis 25 and its end 29 which is remote from the head is connected directly to stationary parts of the recorder, for example by an electrical connector (not shown). Translations of the head in the axial direction 25 consequently result in the spiral being extended/compressed. Pivotal movements of the head result in the spiral being coiled/uncoiled.

Figure 2:
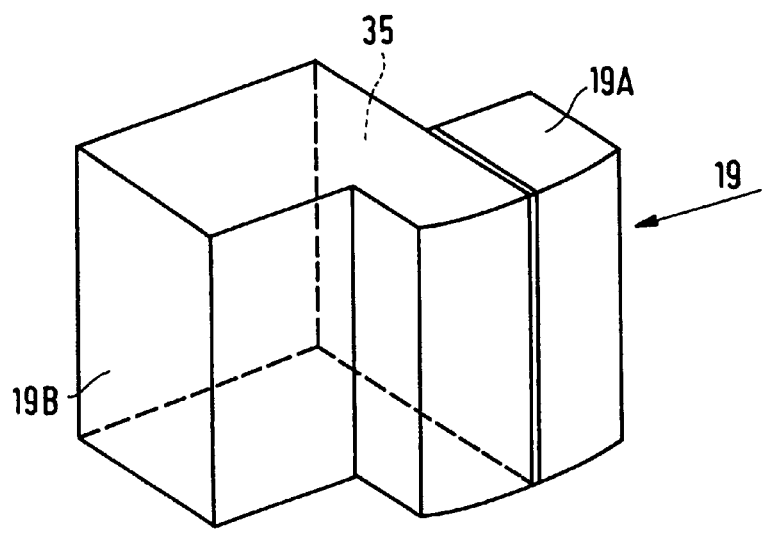
FIG. 2 is a perspective view the thin-film magnetic head used in said recorder.
Figure 3:
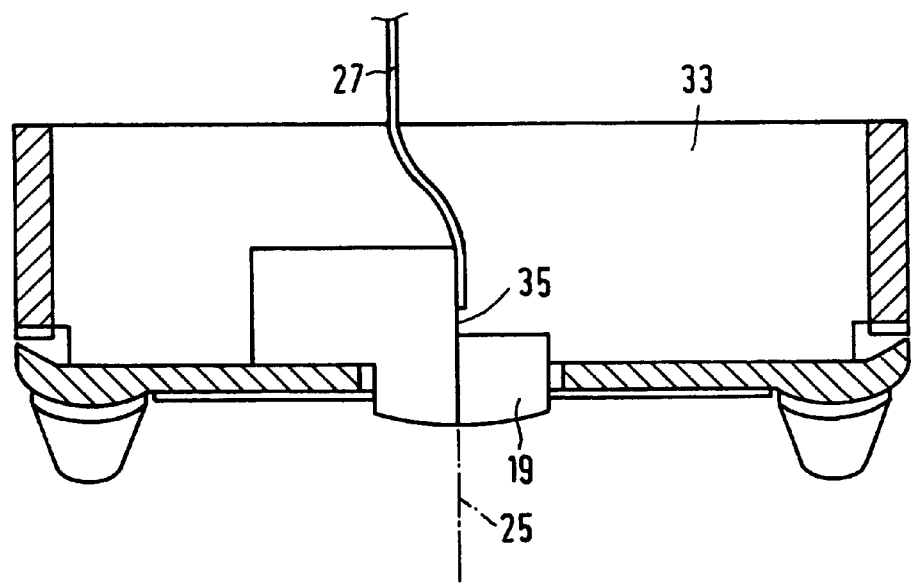
FIG. 3 is a sectional view of a housing which accommodates the head shown in FIG. 2.
Figure 4:
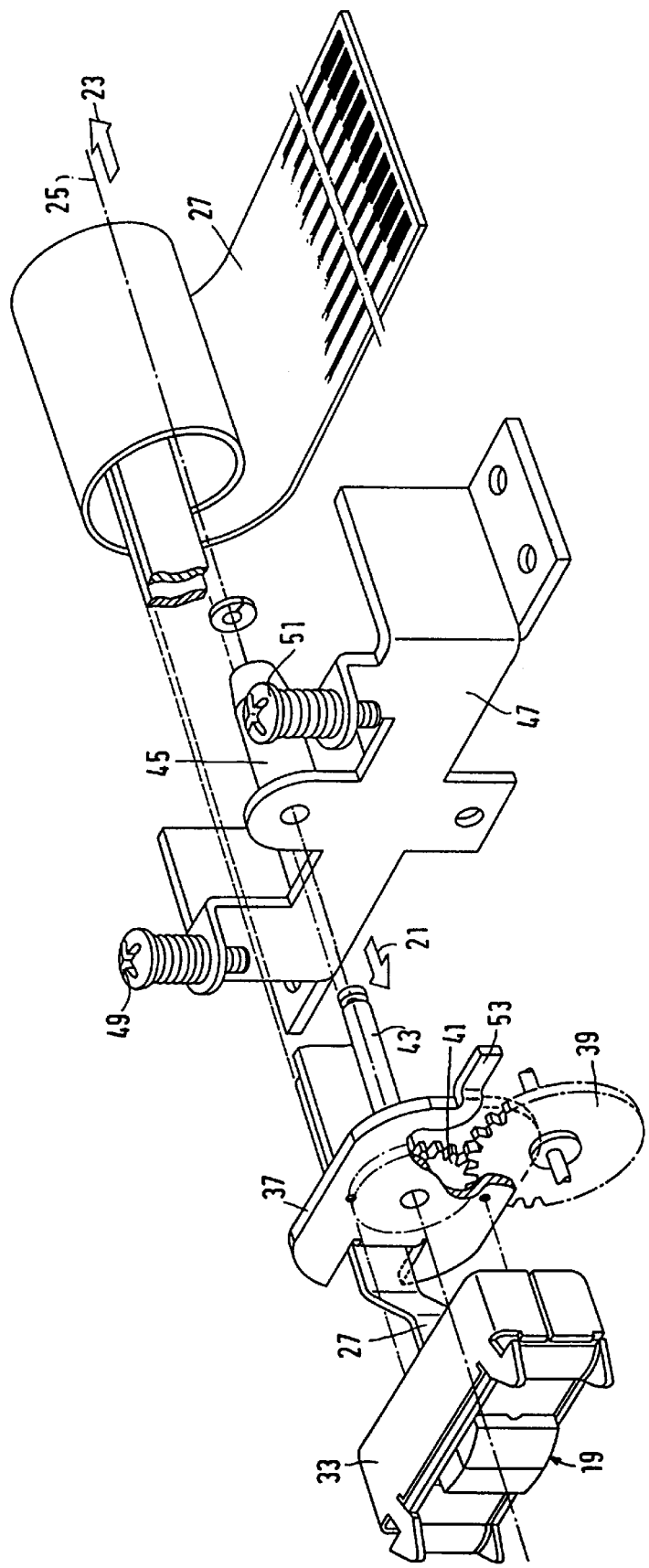
FIG. 4 is an exploded view of a part of a head unit.

FIG. 2 shows that the head 19 comprises two sections 19A and 19B secured to one another. The active parts of the head are situated at the separation 31 between the two sections. As is shown in FIG. 3, the head is accommodated in a housing 33. The electrical tracks to be electrically connected to the conductor 27 are situated on the surface 35 of the head. By means, not shown, the housing 33 is arranged on a support 37, which is pivotable through 180° about the pivotal axis 25. The pivotal movement is obtained by means of a driven toothed wheel 39, which cooperates with a toothed wheel 41 which is fixedly connected to the support 37. The support 37 carries a pin 43, which is journalled in a sleeve 45 of a mounting 46. Set-screws 49 and 51 cooperate with a stop 53 of the support 37. The support 37 comprises a strip 55 to which the inner portion of the spiralled conductor 27 is secured.

Figure 5:
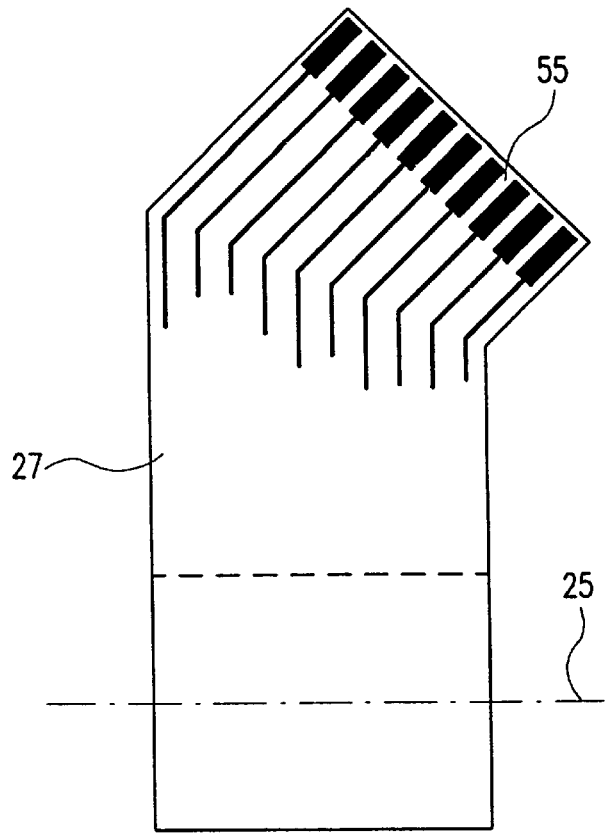
FIG. 5 is perspective view of a part of a printed foil.

The end 55 of the conductor 27 which is remote from the head 19 extends parallel to the direction of the pivotal axis 25. If desired, the end of the conductor may extend transversely of the direction of the pivotal axis, as is shown in FIG. 5. This may be advantageous for connecting the conductor to other parts. In either case the conductor end 55 which is remote from the head is disposed in a plane which extends tangentially to the outer turn of the spiral.

Figure 6:
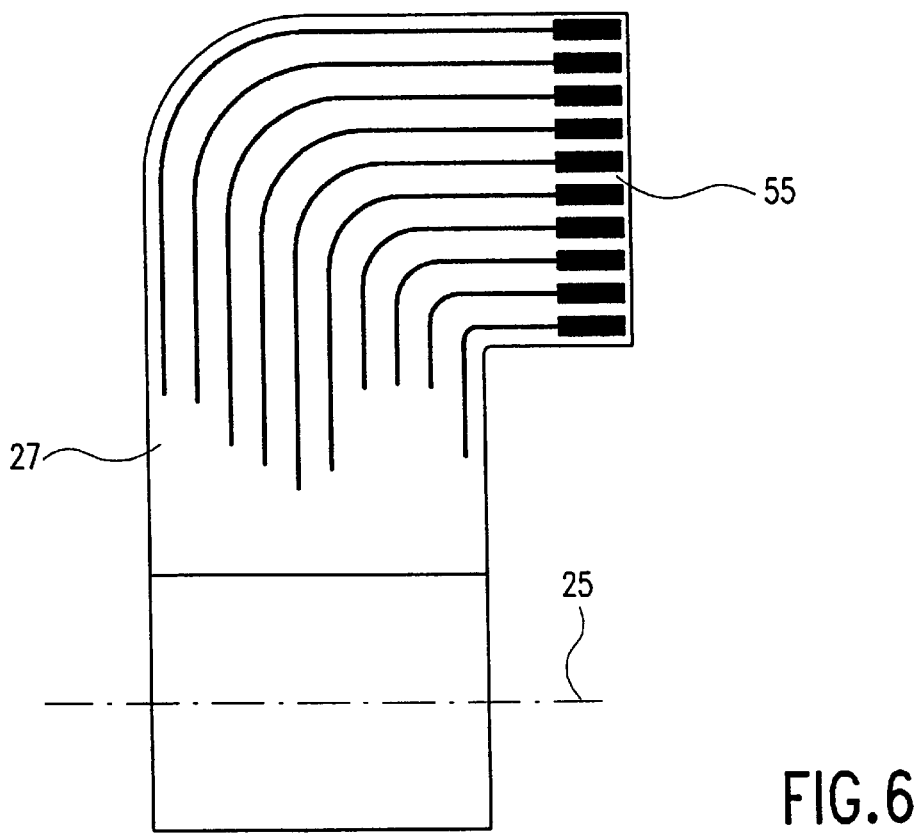
FIG. 6 is a perspective view of a printed foil of another embodiment.

FIG. 6 shows an embodiment in which the conductor end which is remote from the head extends at an acute angle to the direction of the pivotal axis.

Although the invention has been described with reference to the drawings this does not imply that the invention is limited to the embodiments shown in the drawings. The invention likewise relates to all embodiments which deviate from those shown in the drawings but within the scope defined by the Claims and which utilize the basic idea of the invention, which entails that the conductor is formed into a spiral about the pivotal axis of the head and can thus be coiled and uncoiled in the case of pivotal movements of the head and can be extended and compressed in the case of movements along the pivotal axis.

I claim:

1. A magnetic cassette recorder comprising a magnetic head which can be translated between an operating position, in which the head cooperates with a magnetic tape in an inserted cassette, and a withdrawn position, in which the head is clear of an inserted cassette, and which is, moreover, pivotable about a pivotal axis between a first angular position and a second angular position, which head is electrically connected to stationary parts of the recorder by means of a flat flexible multiple electrical conductor, such as a foil carrying printed electrical conductor tracks or a flat cable, characterized in that the conductor is arranged as a cylindrical spiral about the pivotal axis and its end which is remote from the head is connected directly to the stationary parts of the recorder, so that translations of the head in the axial direction result in the spiral being extended/compressed and pivotal movements of the head result in the spiral being coiled/uncoiled.

2. A recorder as claimed in claim 1, characterized in that the conductor end which is remote from the head is a conductor portion which extends parallel to the direction of the pivotal axis.

3. A recorder as claimed in claim 1, characterized in that the conductor end which is remote from the head is a conductor portion which extends transversely of the direction of the pivotal axis.

4. A recorder as claimed in claim 1, characterized in that the conductor end which is remote from the head is disposed in a plane which extends at least substantially tangentially to the outer turn of the spiral.

5. A recorder as claimed in claim 1, characterized in that the conductor end which is remote from the head extends at an acute angle to the direction of the pivotal axis.

* * * * *